United States Patent
Ruiz et al.

(10) Patent No.: US 6,643,974 B2
(45) Date of Patent: Nov. 11, 2003

(54) PIVOTING ROD HOLDER

(75) Inventors: Edwin Ruiz, Los Angeles, CA (US); Hans Ruiz, Gardena, CA (US)

(73) Assignee: Windline, Inc., Los Angeles, CA (US)

( * ) Notice: Subject to any disclaimer, the term of this patent is extended or adjusted under 35 U.S.C. 154(b) by 0 days.

(21) Appl. No.: 10/102,590

(22) Filed: Mar. 20, 2002

(65) Prior Publication Data

US 2003/0182842 A1 Oct. 2, 2003

(51) Int. Cl.[7] .................................................. A01K 97/10
(52) U.S. Cl. .................................... 43/21.2; 248/517
(58) Field of Search ................... 43/21.2; 211/70.8; 248/514, 515, 516, 518, 520, 521, 523, 534, 536, 538, 517

(56) References Cited

U.S. PATENT DOCUMENTS

| | | | | | |
|---|---|---|---|---|---|
| 2,360,402 | A | * | 10/1944 | Determan | 43/21.2 |
| 2,719,687 | A | * | 10/1955 | Hiscock | 248/539 |
| 2,946,546 | A | * | 7/1960 | Pokorny et al. | 248/534 |
| 3,063,668 | A | * | 11/1962 | Yohe | 248/538 |
| 3,212,740 | A | * | 10/1965 | Greenberg | 248/514 |
| 3,290,816 | A | * | 12/1966 | Eklof | 43/21.2 |
| 3,724,791 | A | * | 4/1973 | Mason | 248/514 |
| 3,977,637 | A | * | 8/1976 | Newton | 248/514 |
| 4,219,955 | A | * | 9/1980 | Lo Bosco | 43/15 |
| 4,948,083 | A | * | 8/1990 | McNaney, Jr. et al. | 248/514 |
| 5,065,540 | A | * | 11/1991 | Potter, Jr. | 43/21.2 |
| 5,070,638 | A | * | 12/1991 | Tregaskis | 43/15 |
| 5,163,244 | A | * | 11/1992 | Rupp | 43/21.2 |
| 5,231,785 | A | * | 8/1993 | Roberts | 43/21.2 |
| 5,460,306 | A | * | 10/1995 | Rudd | 224/557 |
| 5,519,959 | A | * | 5/1996 | Cross | 43/21.2 |
| 5,551,184 | A | * | 9/1996 | Grosse | 43/25 |
| 5,738,035 | A | * | 4/1998 | Rupp, II | 114/255 |
| 5,813,163 | A | * | 9/1998 | Dysarz | 43/21.2 |
| 5,813,164 | A | * | 9/1998 | Liberto | 43/21.2 |
| 5,855,088 | A | * | 1/1999 | Lee | 43/21.2 |
| 5,910,004 | A | * | 6/1999 | Antosh | 43/21.2 |
| 5,921,014 | A | * | 7/1999 | Lee | 43/21.2 |
| 5,921,196 | A | * | 7/1999 | Slatter | 114/255 |
| 6,050,034 | A | * | 4/2000 | Krinner | 52/155 |
| 6,089,524 | A | * | 7/2000 | Lai | 248/535 |
| 6,318,017 | B1 | * | 11/2001 | Genardo | 43/21.2 |

FOREIGN PATENT DOCUMENTS

DE                4000375        *    7/1990

* cited by examiner

Primary Examiner—Peter M. Poon
Assistant Examiner—D. Parsley
(74) Attorney, Agent, or Firm—Irving Keschner

(57) ABSTRACT

A Pivoting Rod Holder for securing fishing rods in a variety of positions while they are in use is described. A rod holder tube is a component of a pivoting rod holding system, which has as its additional components a base with a plurality of catch indentations, a collar, a retaining plate, and a plunger-operated locking mechanism at the base of the rod holder tube. A rod placed in the rod holder tube can be locked into any position along a 360 degree axis by simply pulling the rod holder tube up till it is parallel with the catch indentations in the base, spinning it into the desired position, and pulling back firmly on it. This pushes the plunger-operated locking mechanism at the base of the rod holder tube into one of the catch indentations in the base, where it is secured. To release, the rod holder tube is pushed on until the plunger-operated locking mechanism is popped out of the catch indentation in the base. It can then be reset using the same process as above or can be re-stowed by returning it to the vertical position and pushing down.

6 Claims, 14 Drawing Sheets

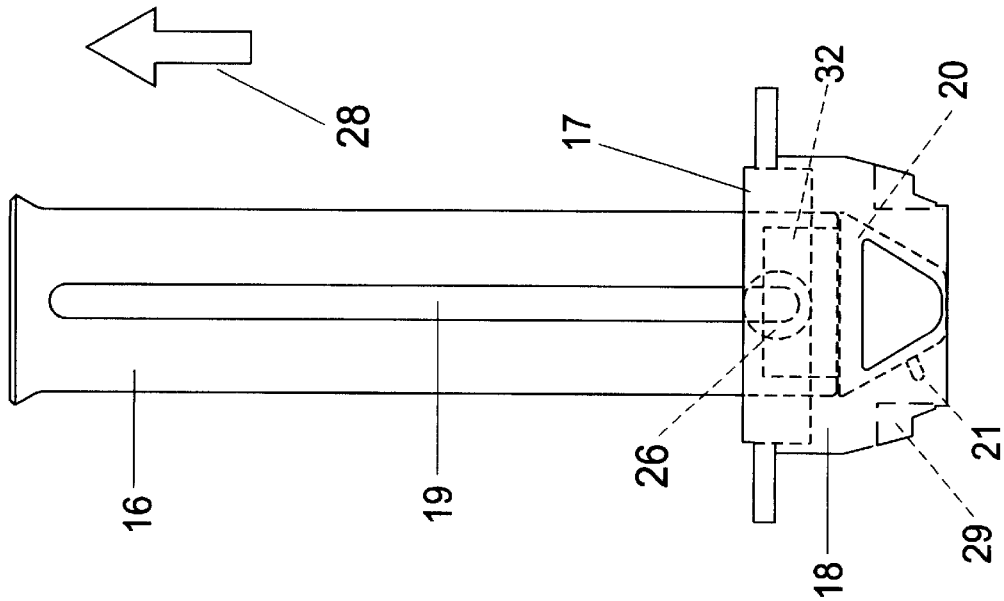

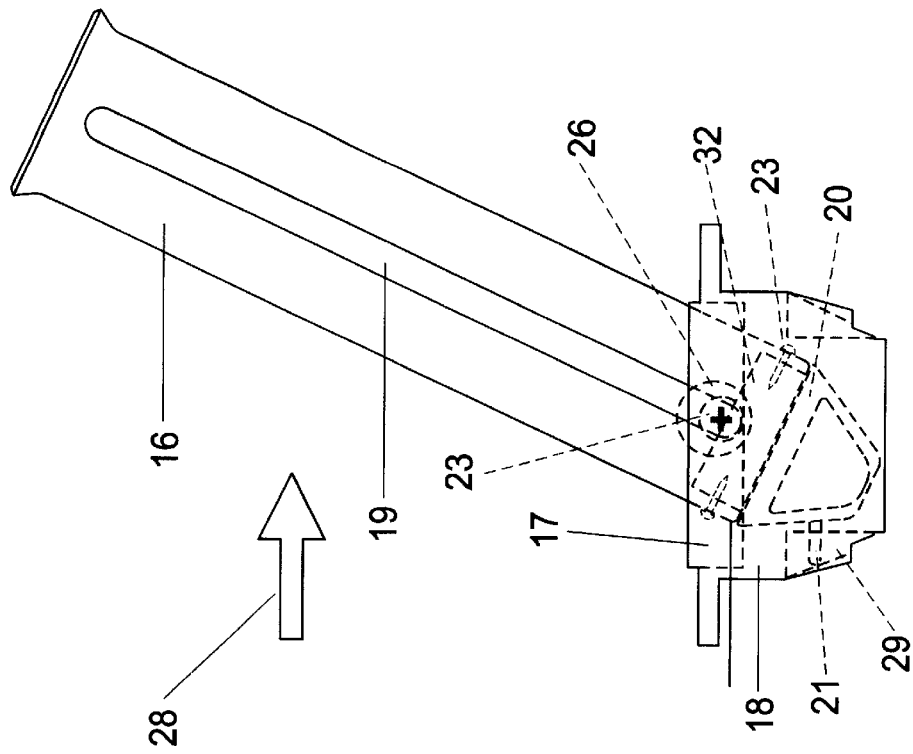
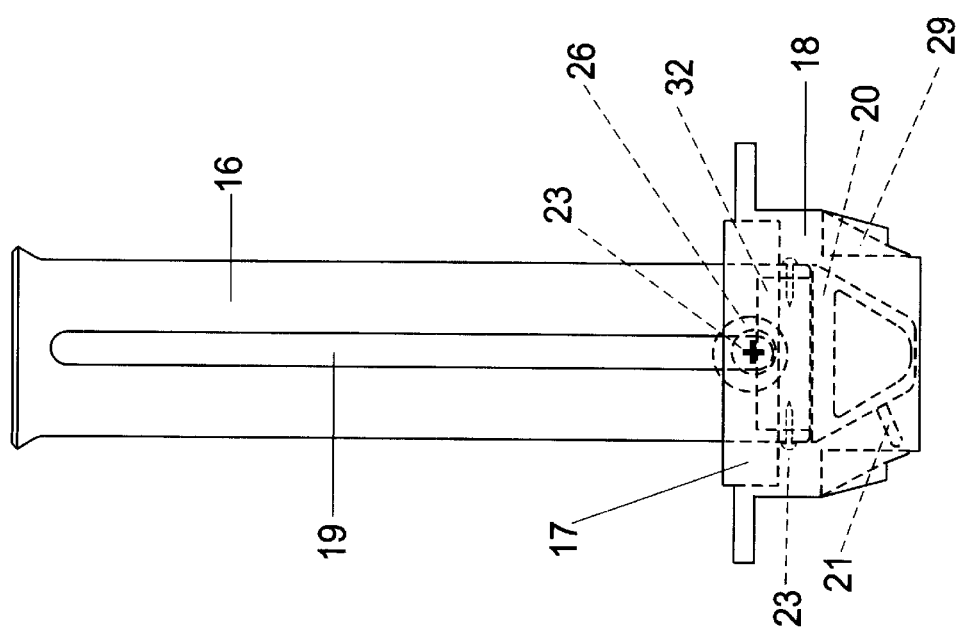

PIVOTING ROD HOLDER

BACKGROUND

1. Field of Invention

This invention relates to pivoting fishing rod holders, specifically those for use aboard recreational marine vessels.

2. Description of Prior Art

Aboard recreational marine craft where people engage in fishing activity that requires the use of fishing rods, it is impossible for the people who are fishing to hang on to their fishing rods during the entire trip at sea. Some type of device or implement is needed, therefore, to secure the rod or rods while people aboard the boat attend to other tasks. It is because of this need that a staggering variety of fishing rod holders have been invented and are currently on the market. In fact, there are many, if not hundreds, of varieties of fishing rod holders currently available or in the process of development. Most of these rod holders fall into three kinds of categories; the non-adjustable type for simply storing the rods while they are not in use, the non-adjustable type for holding the rods while they are in use, and the adjustable type for holding the rods while they are in use.

Fishing for game fish at sea is a process that can take hours. As a result, it sometimes requires that a baited line be left trolling in the water for extended periods of time. Holding the rod through that entire time would be impossible when there are other things to do aboard the boat. Therefore the need for some type of rod holders has arisen. Leaving the rod unattended also requires that the rod remains secured within some type of rod holder for the obvious reason it doesn't accidentally get yanked away by a large game fish when the fish first pulls on the bait. Yet the most important requirement lacking in most rod holders that are currently available is that the rod needs to be mounted in an adjustable rod holder that allows for striking a fish without having to remove the rod from the rod holder tube. Striking involves pulling back hard and rapidly on the fishing rod in order to bring the fish aboard as quickly as possible after it has taken the bait. With most non-adjustable rod holders, the rod must be removed from the holder before the fish can be struck. This delay often gives the fish a chance to get away. This is why a rod holder that is adjustable and that pivots to allow for striking without rod removal is essential. In addition to this, a rod holder that is adjustable, that is, that can spin 360 degrees on the base and can be pushed or pulled forward, is needed to move the rod into different fishing positions and spin the rod around when bringing a fish aboard or when re-setting the hook. Another important requirement is size. The space aboard most average-sized recreational craft is highly limited to begin with. Therefore, any type of marine equipment, including rod holders, needs to be as compact as possible to preserve space.

These reasons, combined with the fact that most people remove their rods from the boat when they leave, have resulted in the greatest demand being generated for the adjustable type of rod holder used to hold the rod while it is still baited and trolling for fish.

Yet most of the large number of rod holders currently available on the market either do not meet all these needs or meet them only partially or inadequately. Many of them are bulky and take up a lot of room on vessels where space is already at a premium. A good example is a rod holder presented in U.S. Pat. No. 5,855,087 to Risinger, Jan. 5, 1999. It is a large contraption with a bulky, square base. It cannot be mounted to a transom, and it only allows for up and down angular movement of the fishing rod. It also does not allow for circular movement across its base.

Most of the rod holders available that are used to secure rods that are in use are not adjustable at all, and as a result can only be fixed in one position. One example of this is presented in U.S. Pat. No. 5,557,876A to Parker, Sep. 24, 1996. It consists of a hollow tube with a side cut out portion allowing it to be mounted to a support. It is a simple, easy to install device. However, it is not adjustable and does not make any provisions for securing the rod in the holder. Also, since it is not adjustable, the rod in the rod holder can't simply be swung over the gunwale when the hook needs to be re-set. The user therefore has to endure the inconvenience of removing the rod from the rod holder in order to re-set the hook. It also has an additional drawback in that in order for it to work, it needs to be mounted to an outside support. A better rod holder should be adjustable and able to secure the rod in a variety of positions, allow for removal-free striking and hook setting, and should not rely upon an outside support for mounting.

Many rod holders have catches to secure the rod in the holder yet do not have swiveling and locking ability that allows them to be rotated, snapped back, and pivoted in a variety of positions. This leaves them unable to strike a fish without pulling the rod out of the rod holder. An example of this is a rod holder presented in U.S. Pat. No. 5,065,540 to Potter, Nov. 19, 1991. It provides for securing the rod in its rod holder tube, yet it does not allow the tube to rotate, snap back and pivot. This inability to strike without removing the rod from the holder increases the potential for losing the fish as the user struggles to remove the rod from the rod holder. Besides preventing the user from striking without rod removal, this design also prevents the user from maneuvering the holder in order to fish in different directions.

Another example is a rod holder presented in U.S. Pat. No. 6,338,465 to Stoner, Jan. 15, 2002. Like the one developed by Potter, it is also not adjustable as it cannot swivel or turn in any direction.

These examples reinforce the need for a rod holder that rotates around its base in a variety of directions, has the ability to be pivoted and snap-locked in any one of those directions, allows for fast setting of a hook and striking of fish without removal from the holder, is lightweight and compact, and that is durable and corrosion-resistant.

Some important objects of the invention presented here are to provide a pivoting rod holder that rotates about its axis into a variety of positions, easily snap-locks into and disengages from those positions, allows fast setting of a hook and striking of fish without having to remove the fishing rod from the rod holder, is resistant to rust, and that is long-lasting and durable.

OBJECTS AND ADVANTAGES

A huge number of rod holders currently exist on the market and have been designed for use in many types of environments and situations. Most of these rod holders have been designed for use aboard water-borne craft. Although a great variety of them are available, most of them are inadequate when it comes to serving the needs of the sport fisherman. Most are not adjustable; for example, not allowing the fishing rod in the holder to swivel on its own axis so it can snap to a new direction the user may want to fish in. Those that are not adjustable also do not allow the user to strike a fish or re-set the hook without having to go to the trouble of pulling the rod free of the rod holder. Some rod holders have one characteristic and not the other. In other words, there are those that can swivel and are adjustable but do not have rod-locking mechanisms, and there are those that are not adjustable yet do have locking mechanisms. In addition, most of those that do have locking mechanisms have the types that do not allow for quick release and can only lock the rod in one position. And there are some that are far too bulky for use on board marine craft where space is already at a premium. What is needed is a rod holder that is adjustable, or can spin, on its own axis, has a locking mechanism that safely secures the rod in any position yet allows for rapid release for striking, and that is also lightweight and compact.

The pivoting rod holder presented here provides a lightweight, compact, and adjustable rod holding system that safely secures fishing rods with a locking mechanism that can be locked in any position and that allows for rapid release when striking fish or setting hooks. Accordingly, several objects and advantages of this invention are:

1. The pivoting rod holder is lightweight and compact. It is made of lightweight materials and has very few parts. It is also small and compact enough to be fit on a gunwale. This is critical for use aboard marine craft that have limited space and cannot be weighed down with bulky equipment.
2. The pivoting rod holder is adjustable. Its rod holder tube can swivel on the base that it rests in and is adjustable to a full 360 degrees. Its plunger-operated locking mechanism is adhered to the rod holder tube and is therefore also adjustable to a full 360 degrees. Because of this it can snap-lock the rod holder tube with the rod in it into any position along the same 360 degrees that the rod holder tube can rotate. Therefore, its greatest advantage is that the entire mechanism is adjustable and allows for the ability to rotate and snap-lock the fishing rod into any position.
3. The locking mechanism on the pivoting rod holder allows for fast release when striking a fish or resetting the hook. Besides being able to snap-lock into any position, the locking mechanism allows for easy snap-back for striking a fish without having to take the time to pull the rod free of the rod holder. It does this through use of a plunger at the end of the rod-holding tube that is pushed out by a spring. The plunger can lock into a number of indentations that are along the inner surface of the base of the rod holder. To release the plunger lock from a position, all that needs to be done is snap the rod holder tube back to a 90-degree position. This releases it. To snap it into another position, all one has to do is rotate the rod holder tube around to the desired position and pull back to snap it into another indentation. When striking a fish, all the operator has to do is jerk back hard on the pole and the plunger at the bottom will snap into an indentation and lock the pole in place.

BRIEF DESCRIPTION OF DRAWINGS

FIG. 13 shows the rod holder tube reaching its maximum extension out of the base.

FIG. 14 shows the rod holder tube fully extended from the base before being locked into a position.

FIG. 15 shows the rod holder fully extended, pulled back, and locked into one of the grooves in the base.

Figure 1:
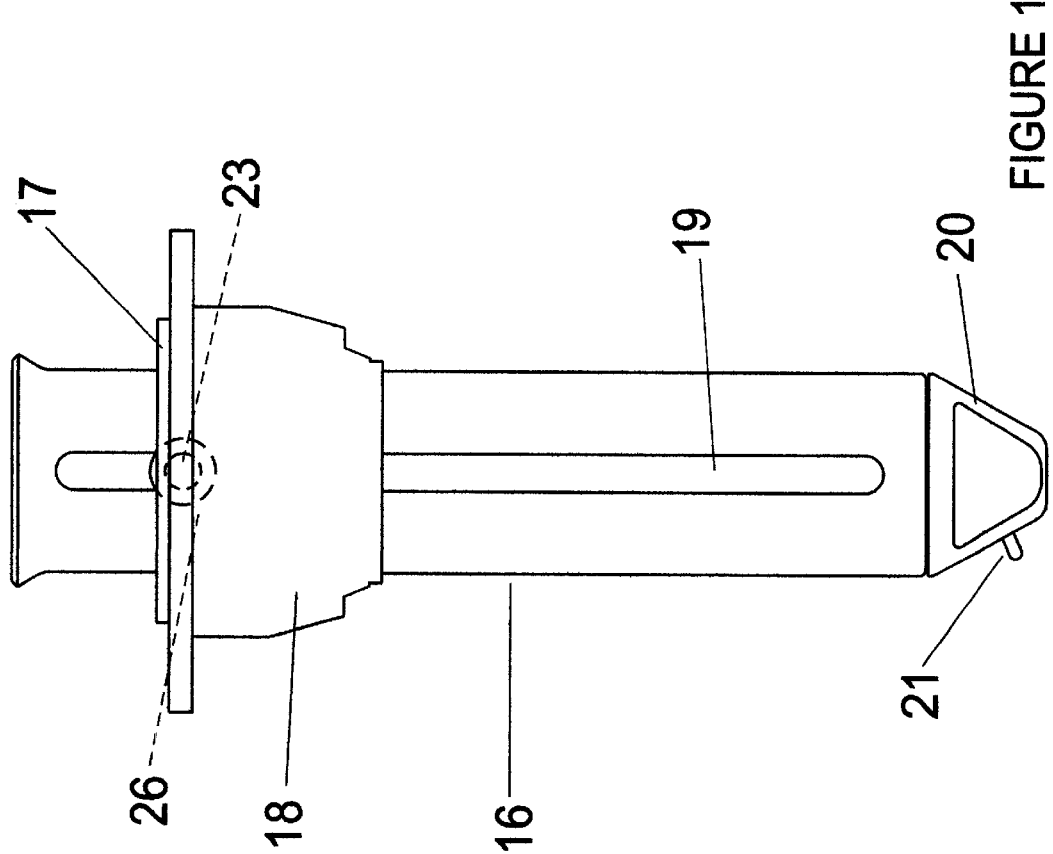
FIG. 1 is a side view showing the whole pivoting rod holder, as it would appear if seen from the side while mounted in the gunwale of a boat.

REFERENCE NUMERALS FOR FIGS. 1–15E.

FIG. 1:
16.—rod holder tube
17.—collar
18.—base
19.—rod holder tube slot(s)
20.—bottom cap
21.—plunger
23.—screw(s)
26.—nylon washer(s)

Figure 2:
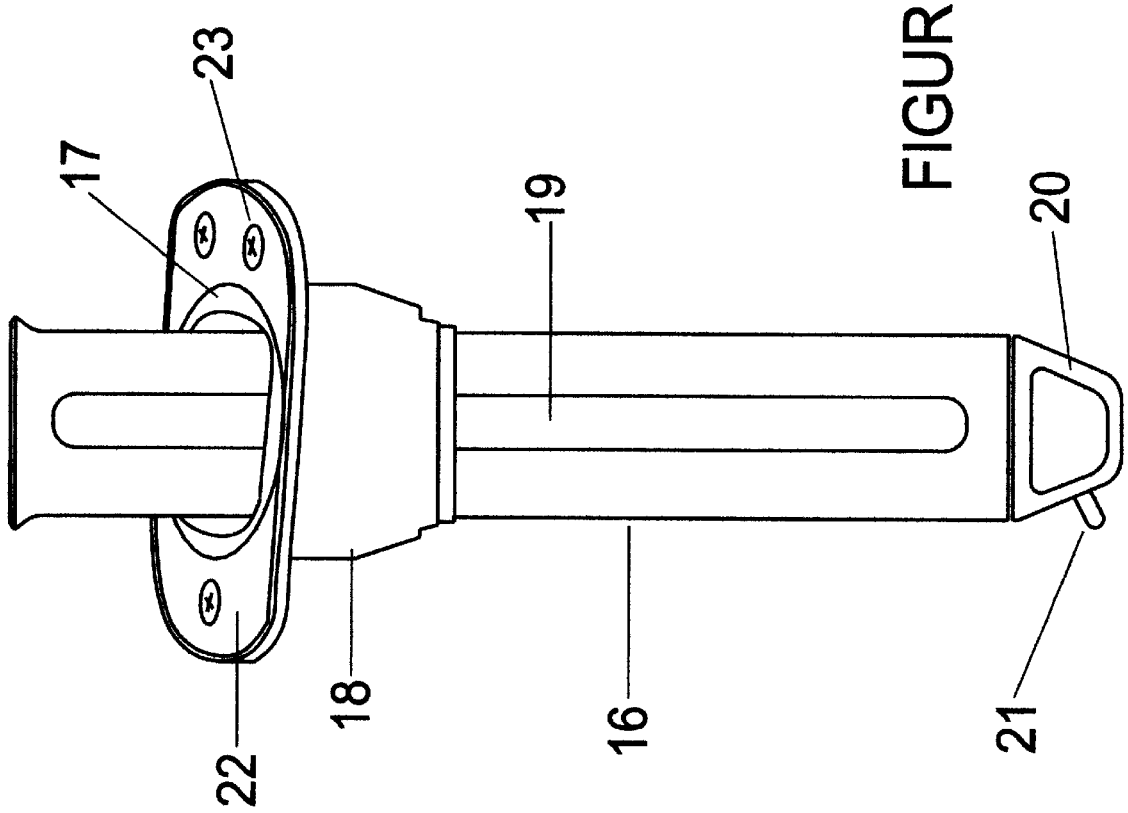
FIG. 2 is a side/perspective view showing the pivoting rod holder from the perspective of looking down and from the side at it.

FIG. 2:
16.—rod holder tube
17.—collar
18.—base
19.—rod holder tube slot(s)
20.—bottom cap
21.—plunger
22.—retaining plate
23.—screw(s)

Figure 3:
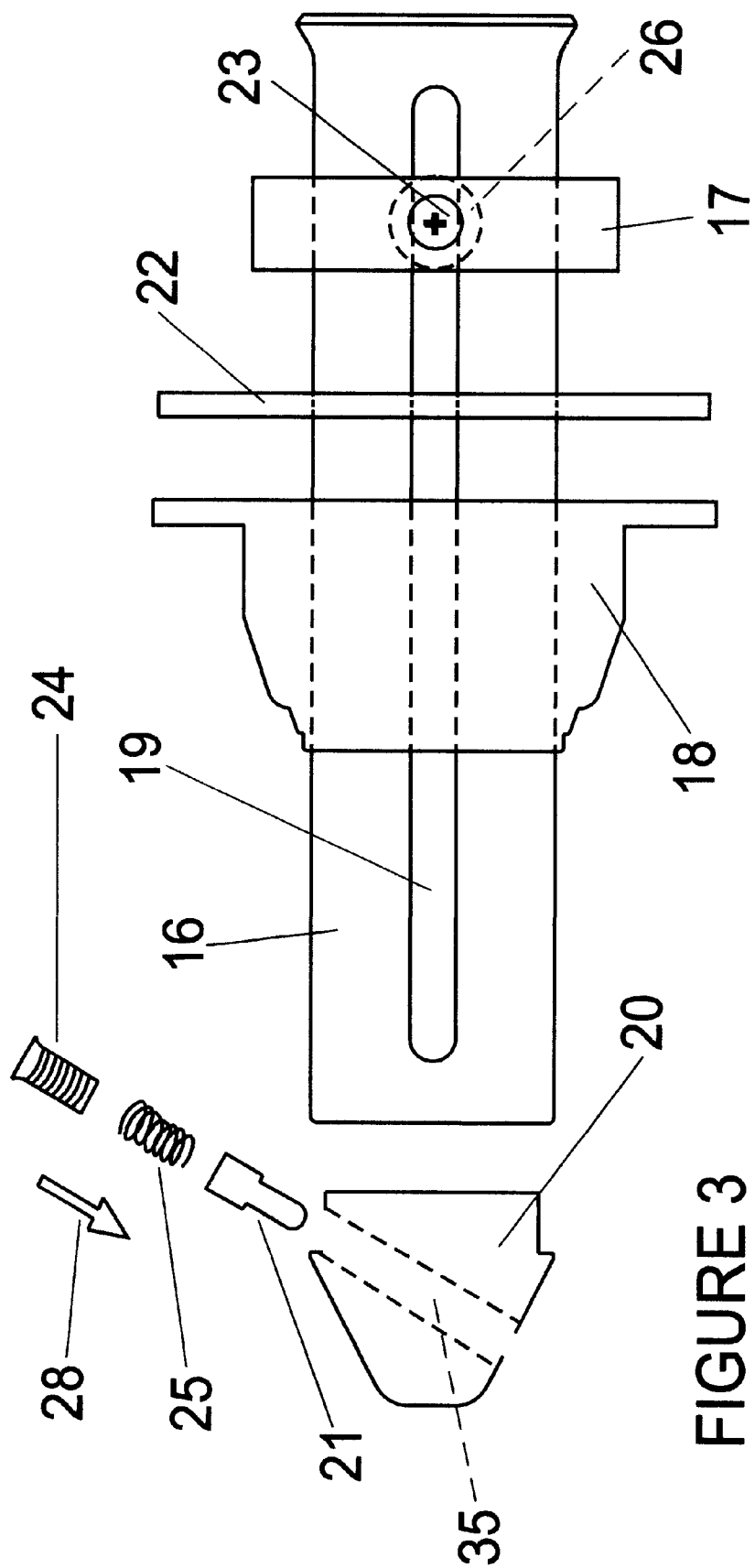
FIG. 3 is an exploded view showing the various components of the pivoting rod holder.
Figure 4:
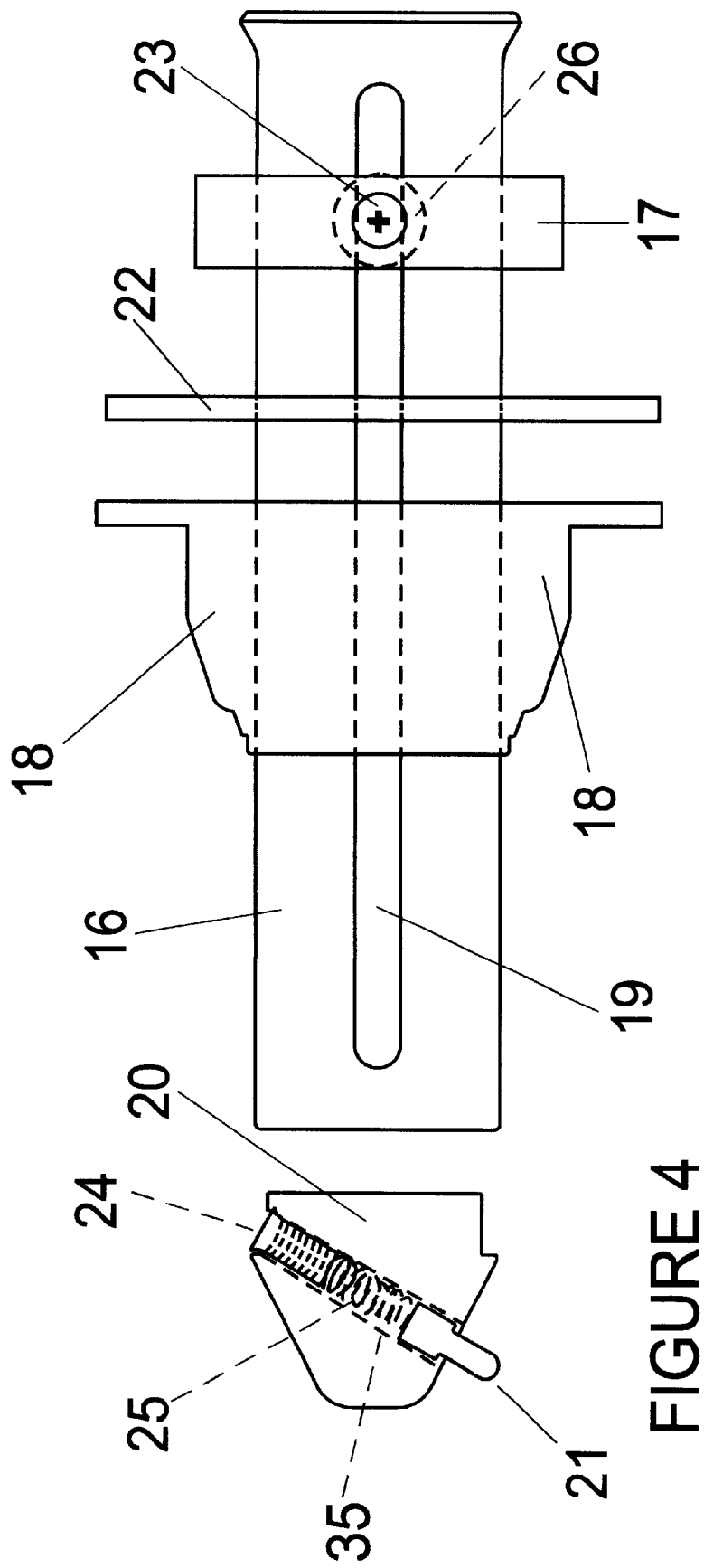
FIG. 4 is a partially exploded side view showing some components of the pivoting rod holder in their assembled state.
Figure 5:
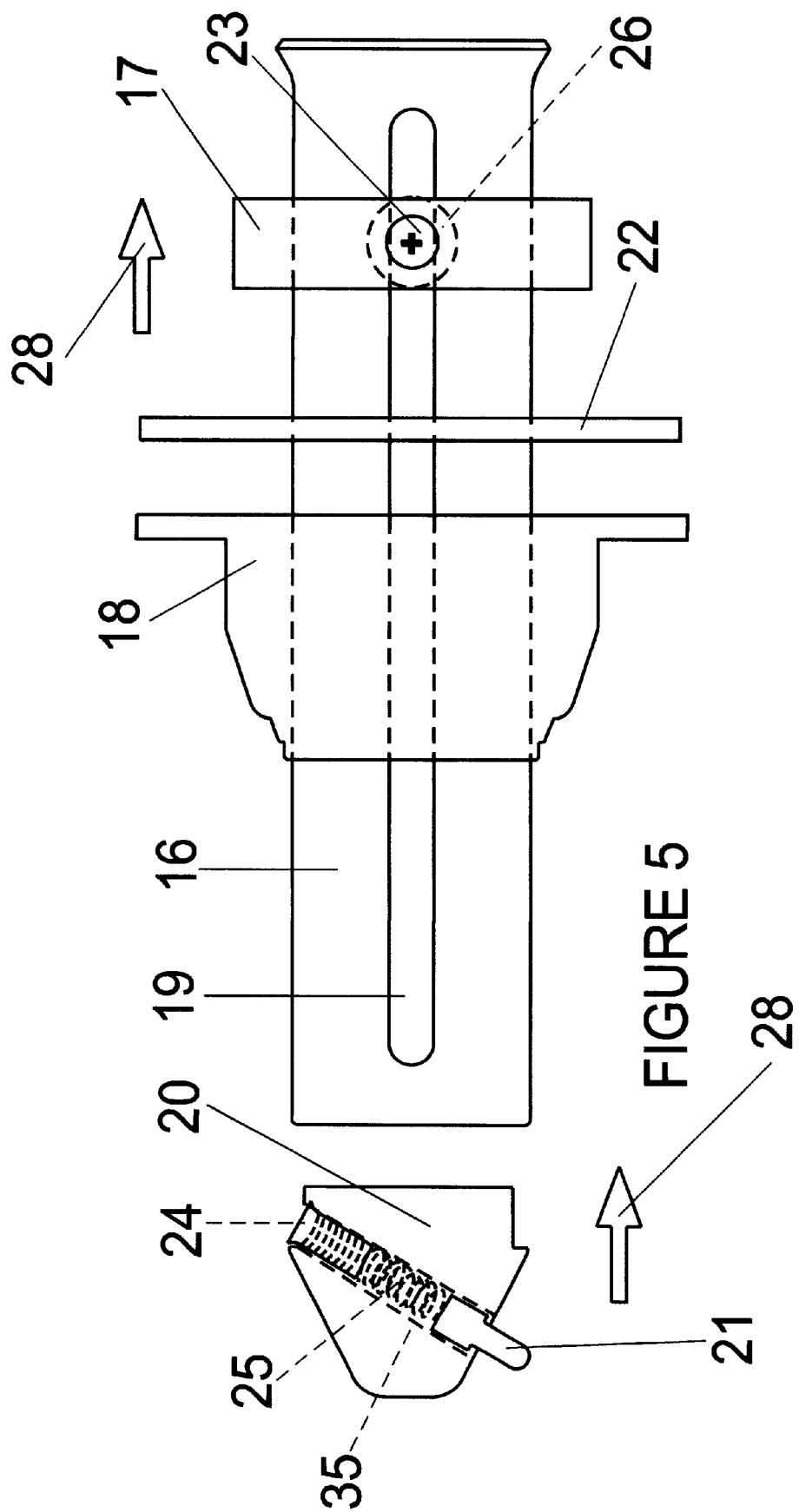
FIG. 5 is another partially exploded side view of the pivoting rod holder showing the components of the rod holder and showing the directions in which the parts are moved and inserted in order to create the finished item.
Figure 6:
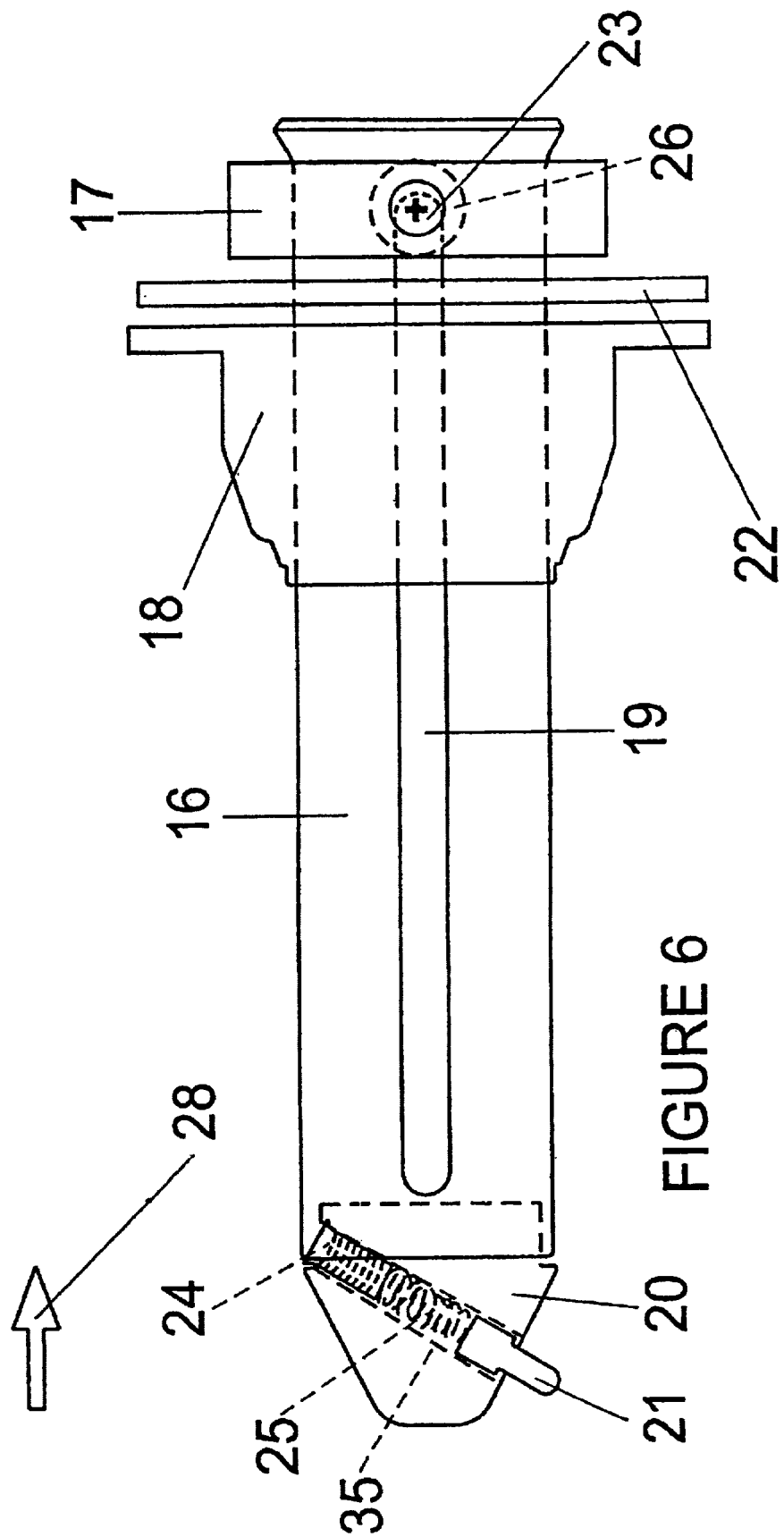
FIG. 6 is another side view of the pivoting rod holder showing it, as it would appear in its almost fully assembled state.
Figure 8:
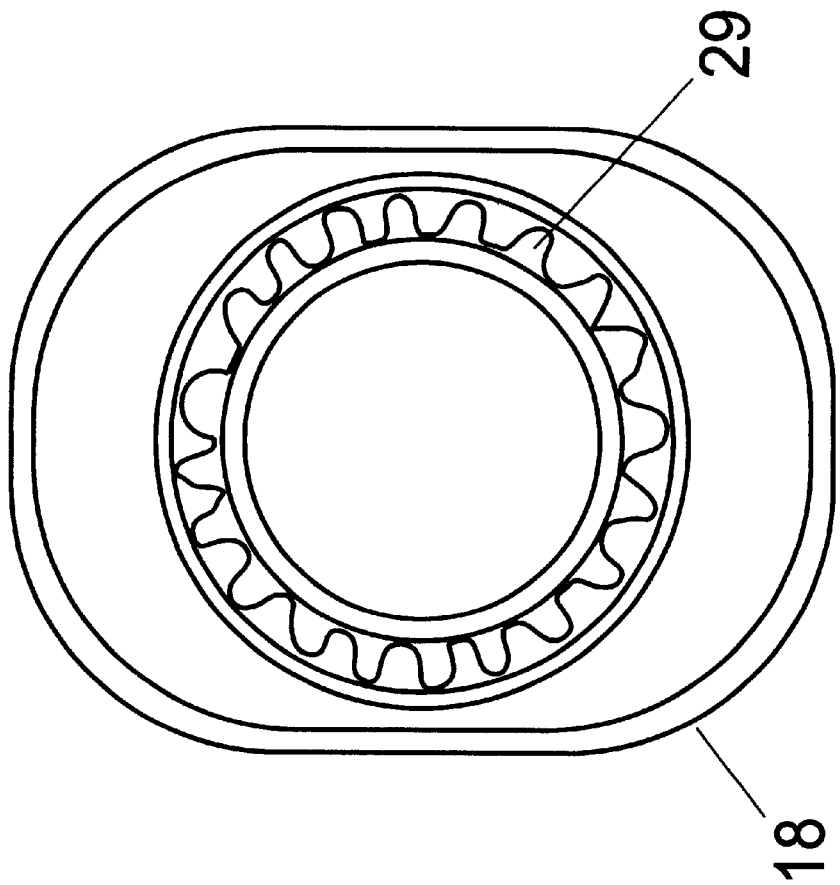
FIG. 8 is a top view of the base showing the grooves or indentations that allow the rod holder to lock into place.
Figure 7:
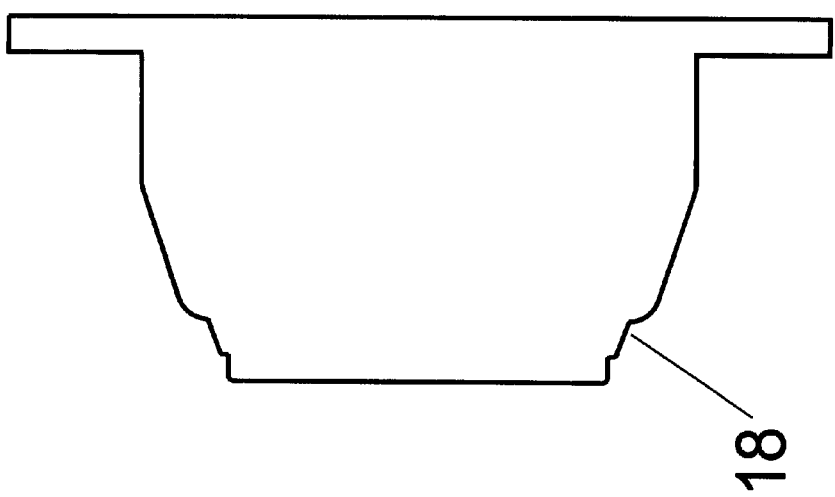
FIG. 7 is a side view of the pivoting rod holder's base.
Figure 10:
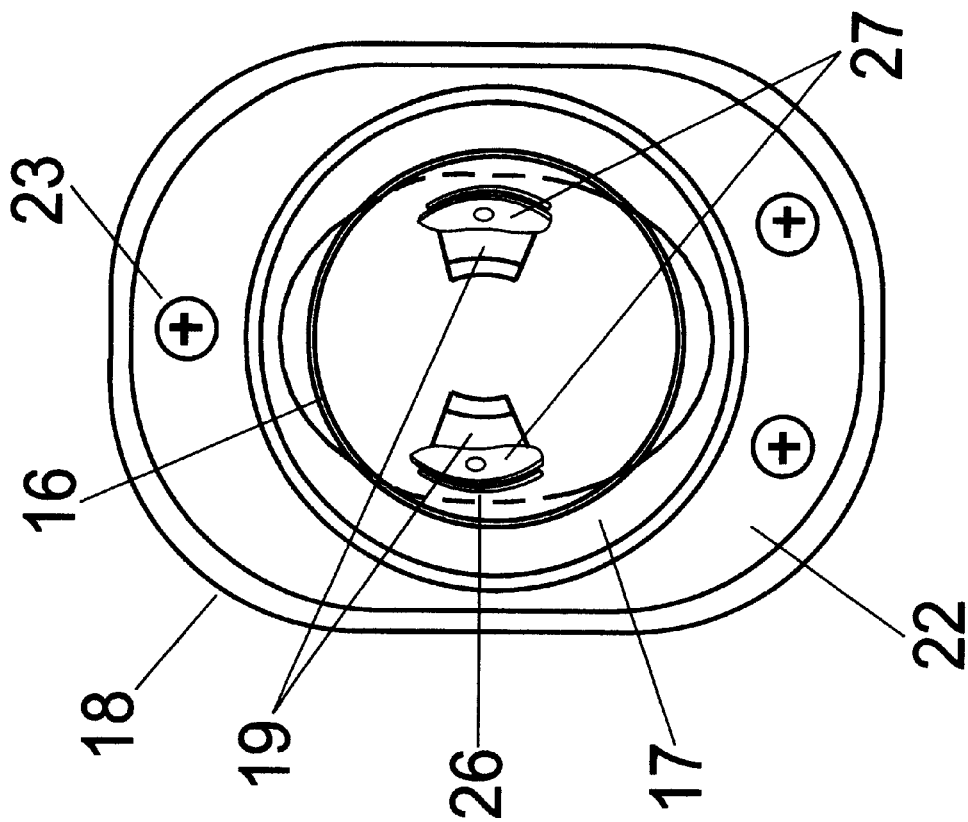
FIG. 10 is a view of the pivoting rod holder from the top showing more of its various components in greater detail.
Figure 9:
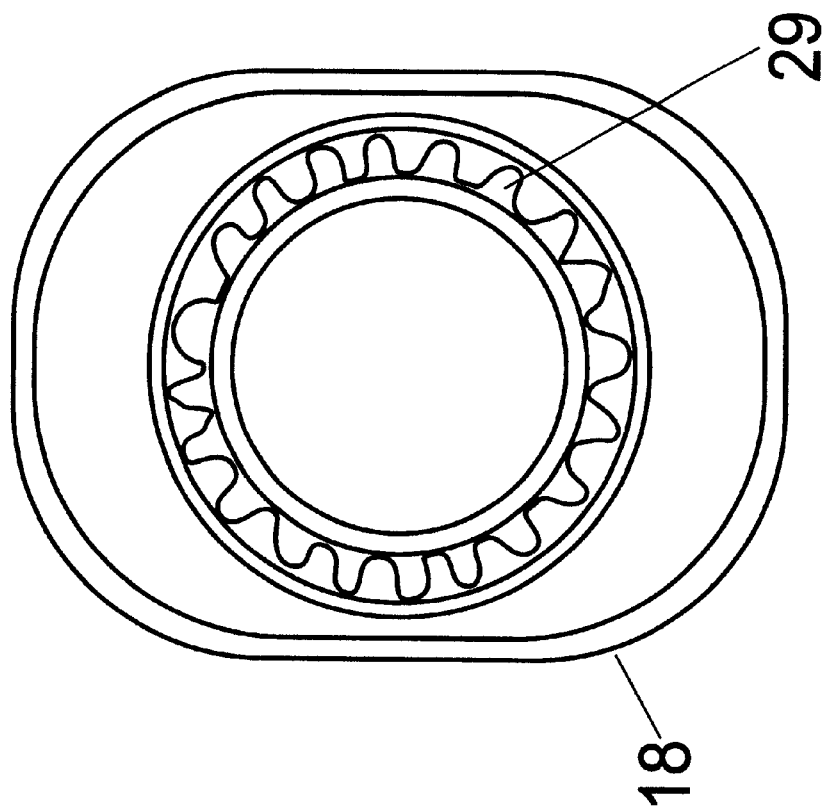
FIG. 9 is again a view of the base from the top showing the grooves or indentations that allow the rod holder to lock into a variety of positions.
Figure 12:
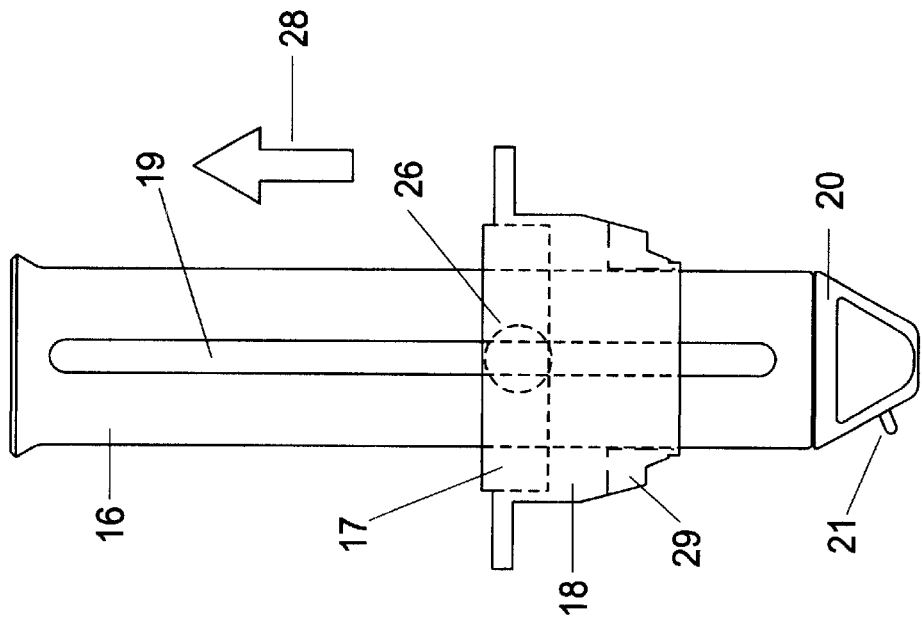
FIG. 12 shows the rod holder being pulled upward before being spun around for adjustment by the user.
Figure 11:
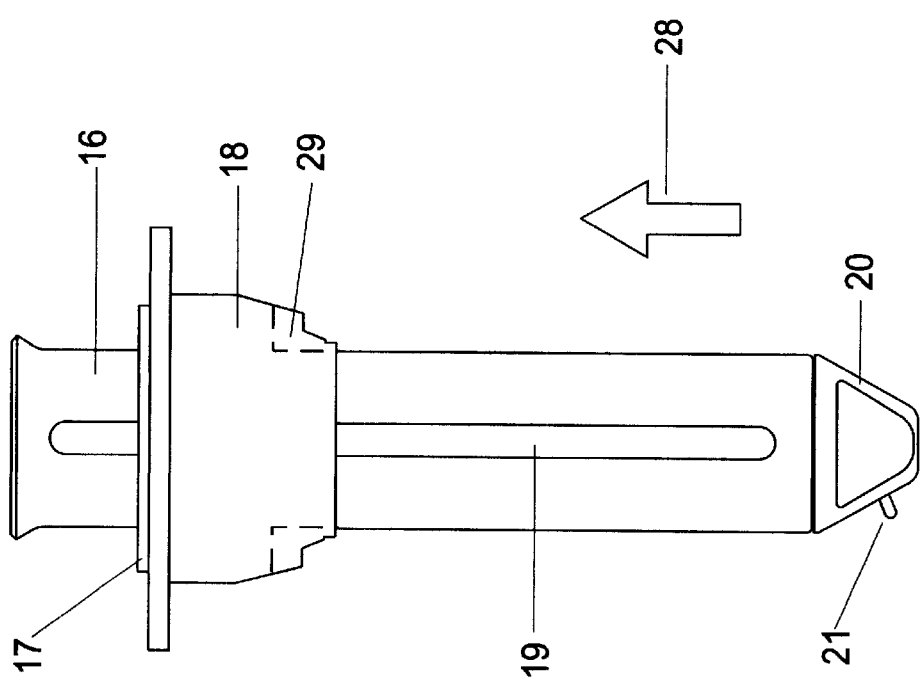
FIG. 11 is a side view of the pivoting rod holder showing it as it would be before it is adjusted for use.
Figure 15A:
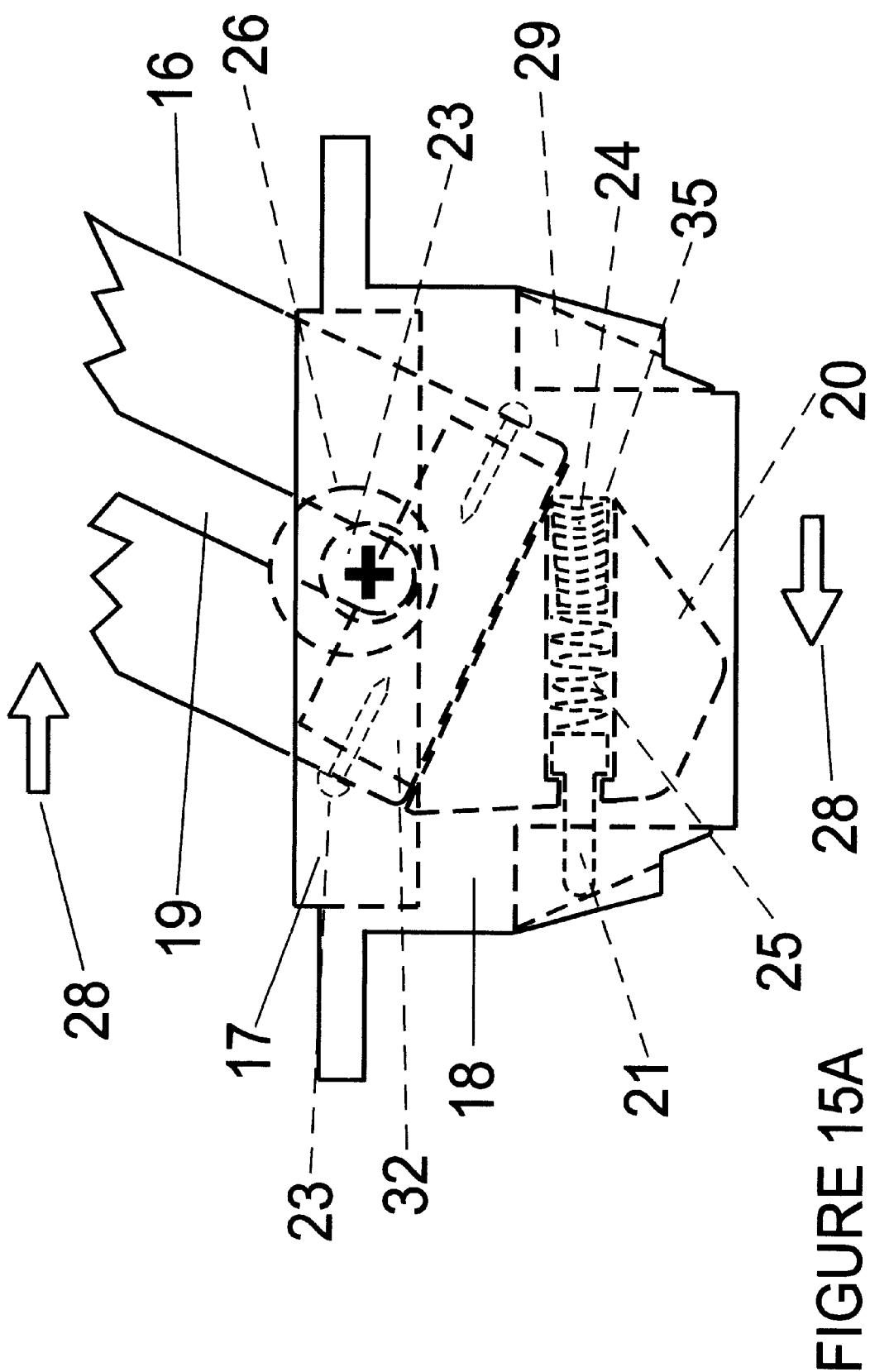
FIG. 15A is a close-up of the bottom cap and its parts engaging one of the catch indentations.
Figure 15C:
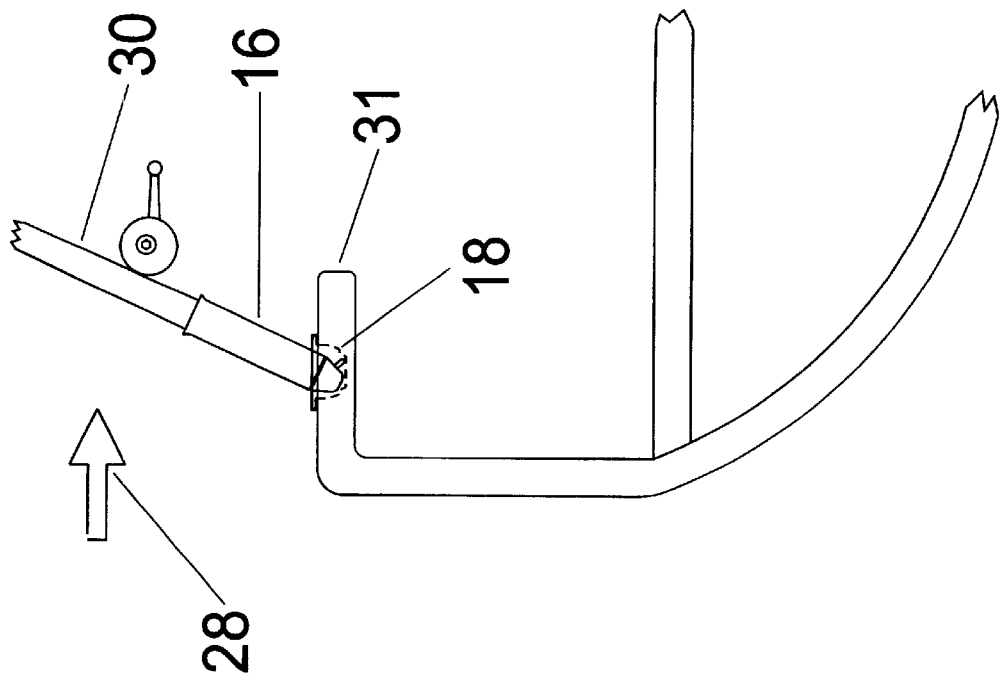
FIG. 15C shows the rod holder as it would appear while striking a fish.
Figure 15B:
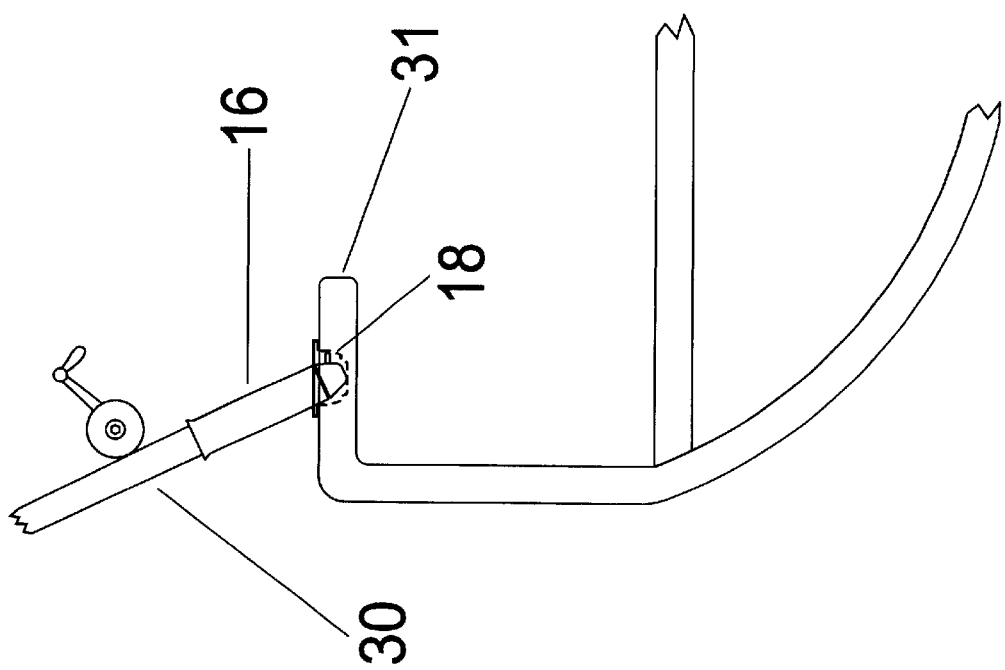
FIG. 15B shows the rod holder as it would appear before striking a fish.
Figure 15E:
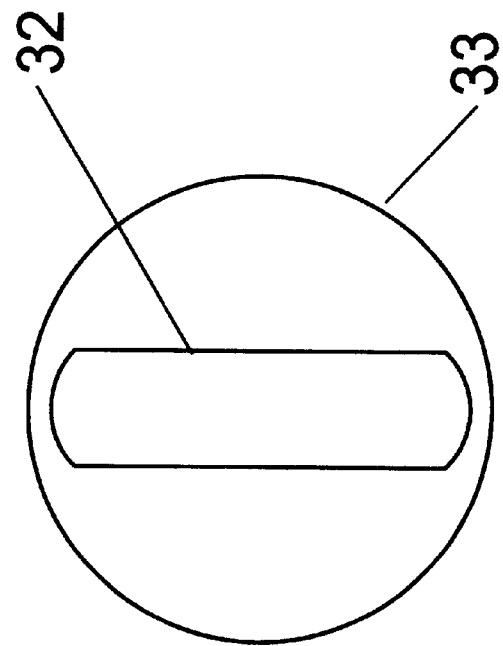
FIG. 15E is another view of the bottom components of the rod holder.
Figure 15D:
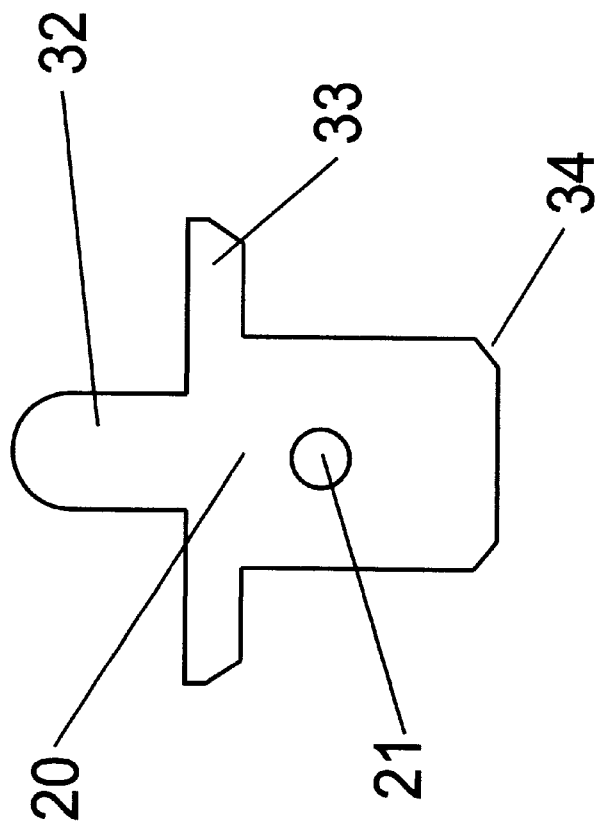
FIG. 15D shows the bottom components of the rod holder.

FIG. 3:
16.—rod holder tube
17.—collar
18.—base
19.—rod holder tube slot(s)
20.—bottom cap
21.—plunger
22.—retaining plate
23.—screw(s)
24.—set screw
25.—spring 26.—nylon washer(s)
28.—arrow depicting direction of movement
35.—aperture
FIG. 4:
16.—rod holder tube
17.—collar
18.—base
19.—rod holder tube slot(s)
20.—bottom cap
21.—plunger
22.—retaining plate
23.—screw(s)
24.—set screw
25.—spring
26.—nylon washer(s)
35.—aperture
FIG. 5:
16.—rod holder tube
17.—collar
18.—base
19.—rod holder tube slot(s)
20.—bottom cap
21.—plunger
22.—retaining plate
23.—screw(s)
24.—set screw
25.—spring
26.—nylon washer(s)
28.—arrow depicting direction of movement
35.—aperture
FIG. 6:
16.—rod holder tube
17.—collar
18.—base
19.—rod holder tube slot(s)
20.—bottom cap
21.—plunger
22.—retaining plate
23.—screw(s)
24.—set screw
25.—spring
26.—nylon washer(s)
28.—arrow depicting direction of movement
35.—aperture
FIG. 7:
18.—base
FIG. 8:
18.—base
29.—catch indentations
FIG. 9:
18.—base
29.—catch indentations
FIG. 10:
16.—rod holder tube
17.—collar
18.—base
19.—rod holder tube slot(s)
22.—retaining plate
23.—screw(s)
26.—nylon washer(s)
27.—inserts
FIG. 11:
16.—rod holder tube
17.—collar
18.—base
19.—rod holder tube slot(s)
20.—bottom cap
21.—plunger
28.—arrow depicting direction of movement
29.—catch indentation(s)
FIG. 12:
16.—rod holder tube
17.—collar
18.—base
19.—rod holder tube slot(s)
20.—bottom cap
21.—plunger
26.—nylon washer(s)
28.—arrow depicting direction of movement
29.—catch indentation(s)
FIG. 13:
16.—rod holder tube
17.—collar
18.—base
19.—rod holder tube slot(s)
20.—bottom cap
21.—plunger
26.—nylon washer(s)
28.—arrow depicting direction of movement
29.—catch indentation(s)
32.—semi-rectangular top portion
FIG. 14:
16.—rod holder tube
17.—collar
18.—base
19.—rod holder tube slot(s)
20.—bottom cap
21.—plunger
23.—screw(s)
26.—nylon washer(s)
29.—catch indentation(s)
FIG. 15:
16.—rod holder tube
17.—collar
18.—base
19.—rod holder tube slot(s)
20.—bottom cap
21.—plunger
23.—screw(s)
26.—nylon washer(s)
28.—arrow depicting direction of movement
29.—catch indentation(s)
FIG. 15A:
16.—rod holder tube
17.—collar
18.—base
19.—rod holder tube slot(s)
20.—bottom cap
21.—plunger
23.—screw(s)
24.—set screw
25.—spring
26.—nylon washer(s)
28.—arrow(s) depicting direction of movement
29.—catch indentation(s)
32.—semi rectangular top portion
35.—aperture
FIG. 15B:
16.—rod holder tube
18.—base
30.—rod
31.—gunwale
FIG. 15C:
16.—rod holder tube 18.—base
28—arrow depicting direction of movement
30.—rod
31.—gunwale
FIG. 15D:
20.—bottom cap
21.—plunger
32.—semi-rectangular top portion
33.—middle circular portion
34.—extending bottom portion
FIG. 15E:
32.—semi-rectangular top portion
33.—middle circular portion

SUMMARY OF THE INVENTION

In accordance with the invention, this pivoting rod holder for holding fishing rods that are in use aboard marine craft is comprised of a rod holder tube with oblong slots along its length, a base with a plurality of catch indentations, a collar, a retaining plate, a bottom cap, a plunger, a set screw, a spring, a plurality of washers, a plurality of inserts, and a plurality of screws. The rod holder tube is anchored to the collar by a plurality of screws and nylon washers that are fitted into the oblong slots along the length of the rod holder tube. This allows for the up and down adjustable movement of the rod holder tube within the entire pivoting rod holder mechanism. The collar, along with the rod holder tube anchored within it, is not secured within the base but can move up and down along with the rod whenever the rod is pulled up to adjust it. It only stays in the base when it and the rod holder tube are in the stowed position. The entire mechanism is anchored to the gunwale by a plurality of screws through a retaining plate, which resides within the top of the base between the inner walls of the base and the collar (when the collar and the rod holder tube are in the stowed position). Within the base and aligned along its inner wall is a plurality of catch indentations. The bottom cap resides in the end of the rod holder tube facing downward into the gunwale. In a slanted, circular groove within the bottom cap resides the plunger, the spring, and the set screw. The plunger extends outward from the circular groove causing it to jut outside the bottom cap. It is forced outward by the spring, which is situated directly behind it. The set screw resides directly behind the spring and prevents it from falling out. The base of the plunger is wider than the part that extends out, which prevents the entire plunger from falling out of the bottom cap.

To adjust the rod holder tube, and therefore the pivoting rod holder, all one needs to do is pull up on the rod holder tube until the bottom cap with the plunger is within and adjacent to the inner area of the base that has the catch indentations. To lock it into the desired position, the operator then spins it in the desired direction, and pulls back hard on it which forces the plunger into one of the catch indentations. Since the spring behind the plunger constantly forces it outward, it locks into one of the catch indentations by pressing hard against it. To release the rod holder tube, the operator pushes the rod holder tube forward, which releases it from the indentation catch. It can then be pushed down and re-stowed or spun around and locked into another position.

DETAILED DESCRIPTION OF INVENTION—FIGS. 1–10, FIG. 15D, FIG. 15E

Referring in greater detail to the drawings, FIG. 1 is a side view that shows the pivoting rod holder in its retracted or stowed state. The rod holder tube slot(s) 19 and rod holder tube 16 are anchored to collar 17 by screw(s) 23 and nylon washer(s) 26. Collar 17 with rod holder tube 16 resides in base 18. It is the rod holder tube slot(s) 19 that allow the rod holder tube 16 to move up and down through base 18. At the end of rod holder tube 16 is bottom cap 20. Protruding from bottom cap 20 is plunger 21.

FIG. 2 is another side view but with an additional perspective of looking down at the invention. Bottom cap 20 with plunger 21 occupies end of rod holder tube 16. Along length of rod holder tube 16 is rod holder tube slot(s) 19. Rod holder tube 16 occupies base 18, which encloses collar 17 and retaining plate 22. It is through retaining plate 22 that screw(s) 23 are inserted to secure base 18 to the gunwale of a ship.

FIG. 3 is another side view with an additional exploded aspect added to enhance viewing of the various components. Rod holder tube 16 along with rod holder tube slot(s) 19 are encompassed by base 18, retaining plate 22, and collar 17. Nylon washer(s) 26 and screw(s) 23 adhere rod holder tube 16 to collar 17 through rod holder tube slot(s) 19. This allows for rod holder tube 16 to be slid up and down through collar 17 and base 18. Shown in exploded view are set screw 24, spring 25, and plunger 21 before insertion into aperture 35, aperture 35 being conically shaped, which runs through bottom cap 20. Arrow 28 depicts the direction of movement in which set screw 24, spring 25, and plunger 21 are inserted into aperture 35.

FIG. 4 is another side view exactly like FIG. 3 except it shows the components of the bottom cap in an assembled state. Set screw 24, spring 25, and plunger 21 have all been inserted into aperture 35, which runs through bottom cap 20. All the other components are presented exactly as they are in FIG. 3.

FIG. 5 is the same as FIG. 4 with the exception of an additional arrow depicting direction of movement 28 added to illustrate base 18, retaining plate 22, and collar 17 coming together in FIG. 6 to form the assembled pivoting rod holder.

FIG. 6 shows set screw 24, spring 25, and plunger 21, which are all inserted into aperture 35. Aperture 35 runs through bottom cap 20, which occupies the end of rod holder tube 16. Arrow depicting direction of movement 28 shows the direction of insertion of bottom cap 20 into rod holder tube 16. Base 18, retaining plate 22, and collar 17 are shown merging together to form the fully assembled pivoting rod holder. Collar 17 is anchored in rod holder tube slot(s) 19 by nylon washer(s) 26 and screw(s) 23.

FIG. 7 is a side view of base 18.

FIG. 8 is a top view of base 18 showing the catch indentations 29 that are essential to fixing the rod holder tube in any desired position.

FIG. 9 is identical to FIG. 8 and serves mainly as a preview to FIG. 10.

FIG. 10 shows base 18 with rod holder tube 16 and collar 17 inside of it. Anchoring rod holder tube 16 to collar 17 by way of rod holder tube slot(s) 19 are nylon washer(s) 26 and inserts 27. Also shown are screw(s) 23 and retaining plate 22.

FIG. 15D is a side view of bottom cap 20 showing its various components. Bottom cap 20 is shown with plunger 21 in extending bottom portion 34. Above extending bottom portion 34 is middle circular portion 33, which is beneath semi-rectangular top portion 32.

FIG. 15E is a top view of the bottom cap showing semi-rectangular top portion 32 and middle circular portion 33.

Operation of Invention—FIGS. 11–15, 15A, 15B, and 15C.

FIG. 11 shows the entire rod pivoting system before it is about to be moved. Rod holder tube 16 with rod holder tube slot(s) 19 occupy base 18, and within base 18 are catch indentations 29 and collar 17. At the end of rod holder tube 16 is bottom cap 20 with plunger 21. Arrow depicting direction of movement 28 shows the direction in which rod holder tube 16 with bottom cap 20 would be moved to lock it into a desired position to hold a fishing rod.

FIG. 12 is identical to FIG. 11 with the exceptions that it shows rod holder tube 16 being pushed up in the direction of arrow depicting direction of movement 28, and also shows nylon washer(s) 26. Again it is being moved into the desired position where someone can place a rod in it.

FIG. 13 has all the features of FIG. 12 except that it shows rod holder tube 16 fully extended and ready to be snap-locked into a position to hold a fishing rod. It shows rod holder tube 16 with rod holder tube slot(s) 19 being pushed upward in direction of arrow depicting direction of movement 28. Nylon washer(s) 26 anchors rod holder tube 16 to collar 17 along rod holder tube slot(s) 19. Plunger 21 in bottom cap 20 is in the position where it is ready to engage catch indentation(s) 29 in base 18. Also shown is semirectangular top portion 32.

FIG. 14 is generally the same as FIG. 13 and is used as a prelude to show what movement occurs in FIG. 15. Again, as in FIG. 13, plunger 21 in bottom cap 20 is in the position to engage one of catch indentations 29 in base 18. Semi-rectangular top portion 32 of bottom cap 20 adheres to rod holder tube 16 with screw(s) 23.

FIG. 15 shows the pivoting rod holder performing its main function as it locks into place in order to hold a fishing rod. As rod holder tube 16 is pulled back in direction of arrow depicting direction of movement 28, plunger 21 in bottom cap 20 is thrust into catch indentation(s) 29. Rod holder tube 16 can be pulled back like this because it pivots on nylon washer(s) 26 and screw(s) 23, which are attached to collar 17. This locks the rod holder in place for placement of a fishing rod in it. Also the rod holder tube has full 360-degree circular movement so it can be swiveled around in base 18 in any direction the operator chooses. Bottom cap 20 adheres to rod holder tube 16 at semi-rectangular top portion 32 with screw(s) 23.

FIG. 15A is a close-up of plunger 21 in aperture 35, which is in bottom cap 20. Plunger 21 is secured in catch indentation 29 as rod holder tube 16 is pulled backward in direction shown by arrow(s) depicting direction of movement 28. Plunger 21 is secured tight in catch indentation(s) 29 because spring 25 pushes out hard on plunger 21, pressing tight up against the wall of catch indentation(s) 29. Set screw 24 holds fast behind spring 25 and prevents spring 25 and plunger 21 from falling out of bottom cap 20. Spring 25 pushes out on plunger 21 in direction shown by arrow depicting direction of movement 28. As in FIG. 15, semi-rectangular top portion 32 of bottom cap 20 adheres to rod holder tube 16 with screw(s) 23.

FIG. 15B shows the pivoting rod holder before striking a fish. Rod 30 is in rod holder tube 16, which is locked in a catch indentation in base 18. Base 18 is mounted in gunwale 31. This shows the pivoting rod holder in a typical position it would be in assuming a fish had just taken the bait. This is right before the point the operator would strike the fish.

FIG. 15C shows the pivoting rod holder being pulled back while striking a fish. Rod 30 is in rod holder tube 16, which is secured in a catch indentation in base 18. Base 18 is mounted in gunwale 31. As the fish is struck, rod 30 and rod holder tube 16 are pulled back sharply in the direction of arrow depicting direction of movement 28. This enables the operator to yank the fish aboard without having to remove the rod from the rod holder first and thus risk losing the fish.

Conclusion, Ramifications, and Scope of Invention

After reviewing the above information, the reader will be able to see that the pivoting rod holder discussed here provides a vast improvement over the extensive variety of rod holders and rod holding systems that already exist in this field. It is simple in design and easy to manufacture. It is compact, low in weight, and mounts easily to the gunwales of marine-going vessels. It adjusts 360 degrees in any direction, and can be locked in any one of those directions by simply pulling back on the rod holder tube. Releasing it from a secured position involves simply pushing the rod holder tube back into a straight up and down position where it is parallel with the base. In addition to these advantages, other advantages of this pivoting rod holder are:

- It is not bulky and as a result can be mounted easily to a variety of gunwales. Many of the rod holders currently available are bulky and take up a large amount of room. This is not acceptable on marine vessels where space is already in short supply. Also, the larger the rod holder the greater the chance of someone accidentally bumping into it and getting injured. The small size and compactness of the pivoting rod holder, and the fact that it stows away in the gunwale, minimizes the possibility of injury and saves valuable space.
- It is very adjustable. The rod holder tube can be rotated a full 360 degrees and can be snap-locked at an angle into any position along the 360 degree axis. If another position is desired, the rod holder tube is easily disengaged by pushing or pulling it back into a straight up and down position, spun to the desired direction along the 360 degree axis, and snapped into that new position.
- It is easy to operate. To set it in a desired position, all that needs to be done is pull the rod holder tube up all the way, rotate it to the desired position, and then pull or push it until it snap-locks into one of the catch indentations in the rod holder base. To release it, all that is needed is to push or pull it away from the catch indentation until the plunger pops out, straighten the rod holder tube into the vertical position, and either re-stow it or rotate and snap it into another position.
- It allows striking of fish without having to remove the fishing rod from the rod holder. Striking a fish involves pulling sharply back on the fishing rod once a fish has taken the bait and engaged the hook. It allows the fisherman to pull the fish aboard the vessel quickly before the fish has a chance to get away. To strike a fish while using a fixed rod holder that cannot be pulled back quickly or pulled back at all, the fisherman has to remove the rod from the rod holder before striking the fish. This wastes time and often results in the fisherman losing the fish while going to the trouble to remove the rod from the rod holder. With the pivoting rod holder, the rod holder tube can be pulled back quickly and locked into a fixed position with the rod still in it. This means the fisherman can strike the fish without having to remove the rod from the rod holder tube. This results in greater convenience and fewer lost catches.
- Since it is made of anodized and waterproofed materials, it will not rust or corrode. The materials that make the pivoting rod holder light are also resistant to corrosion and rust caused by saltwater and/or humidity. This ensures that the pivoting rod holder has a long, durable life of use.

The collar 17, base 18 and cap 20 are preferably made of plastic. Plunger 21 is preferably made of stainless steel.

While the above description contains many details and specifications, these should not be considered a limitation on the scope of this invention, but rather as a description of one preferred embodiment of it. Several other variations are possible. For example, this pivoting rod holder could be made with differently shaped bases or collars. Or it could utilize bottom caps with different designs or rod holder tubes of varying lengths and shapes. And yet another variation could employ a pivoting rod holder with multiple rod holder tubes.

Thus, the scope of this invention should be determined by the following claims and their legal equivalents, rather than by the specifications and examples given.

What is claimed is:

1. A pivoting rod holder mounted to a surface for holding fishing rods comprising:
    a hollow cylindrical member having a longitudinal axis, a plurality of slots formed along a substantial portion of the length thereof, an open end and an end spaced apart from said open end;
    a collar comprising an internal member encircling said hollow cylindrical member, said hollow cylindrical member being anchored to said collar internal member along said plurality of slots;
    a base member comprising an open top portion, a hollow appendage coupled to said open top portion and extending therefrom, a plurality of first locking means encircling the interior of said hollow appendage, said hollow cylindrical member extending through said open top portion of said base member and said hollow appendage;
    means for securing said base member to a mounting surface;
    a cap having an aperture running therethrough and secured to the spaced apart end of said hollow cylindrical member, said aperture terminating in an opening in the surface of said cap;
    second locking means being positioned in said aperture, said second locking means protruding from said opening in said aperture; said open end of said hollow cylindrical member having a first position spaced from said upper surface of said collar member and a second position wherein the open end of said cylindrical member is substantially coplanar with said upper surface, said second locking means comprising a plunger having an end portion from said aperture opening on said cap end and a spring positioned behind said plunger, said plunger end portion not engaging said first locking means when said hollow cylindrical member is substantially parallel to said longitudinal axis and in said first position, said plunger end portion engaging one of said plurality of first locking means when said hollow cylindrical member is pulled back to a third position away from said longitudinal axis, said hollow cylindrical member being locked in said third position as a result thereof.

2. The pivoting rod holder of claim 1 wherein said hollow cylindrical member is moved to a position substantially parallel to said longitudinal axis whereby said hollow cylindrical member is released from said locked third position.

3. The pivoting rod holder of claim 3 wherein said hollow cylindrical member is rotated to a second angular position about said longitudinal axis.

4. The pivoting rod holder of claim 3 wherein said plunger end portion engages another of said locking means when said hollow cylindrical member is pulled back to a fourth position away from said longitudinal axis, said hollow cylindrical member being locked in said fourth position as a result thereof.

5. The pivoting rod-holder of claim 2 wherein said first means comprises a plurality of catch indentation indentations, pulling back on the hollow cylindrical member forcing the end portion of said plunge into a selected one of said catch indentations.

6. The pivoting rod holder of claim 5 wherein said hollow cylindrical member is moved to a position substantially parallel to said longitudinal axis whereby said hollow cylindrical member is released from said selected catch indentation.

\* \* \* \* \*